Jan. 28, 1941.  R. F. BRACKE ET AL  2,229,836
INTERNAL COMBUSTION ENGINE
Original Filed Feb. 26, 1931   5 Sheets-Sheet 1
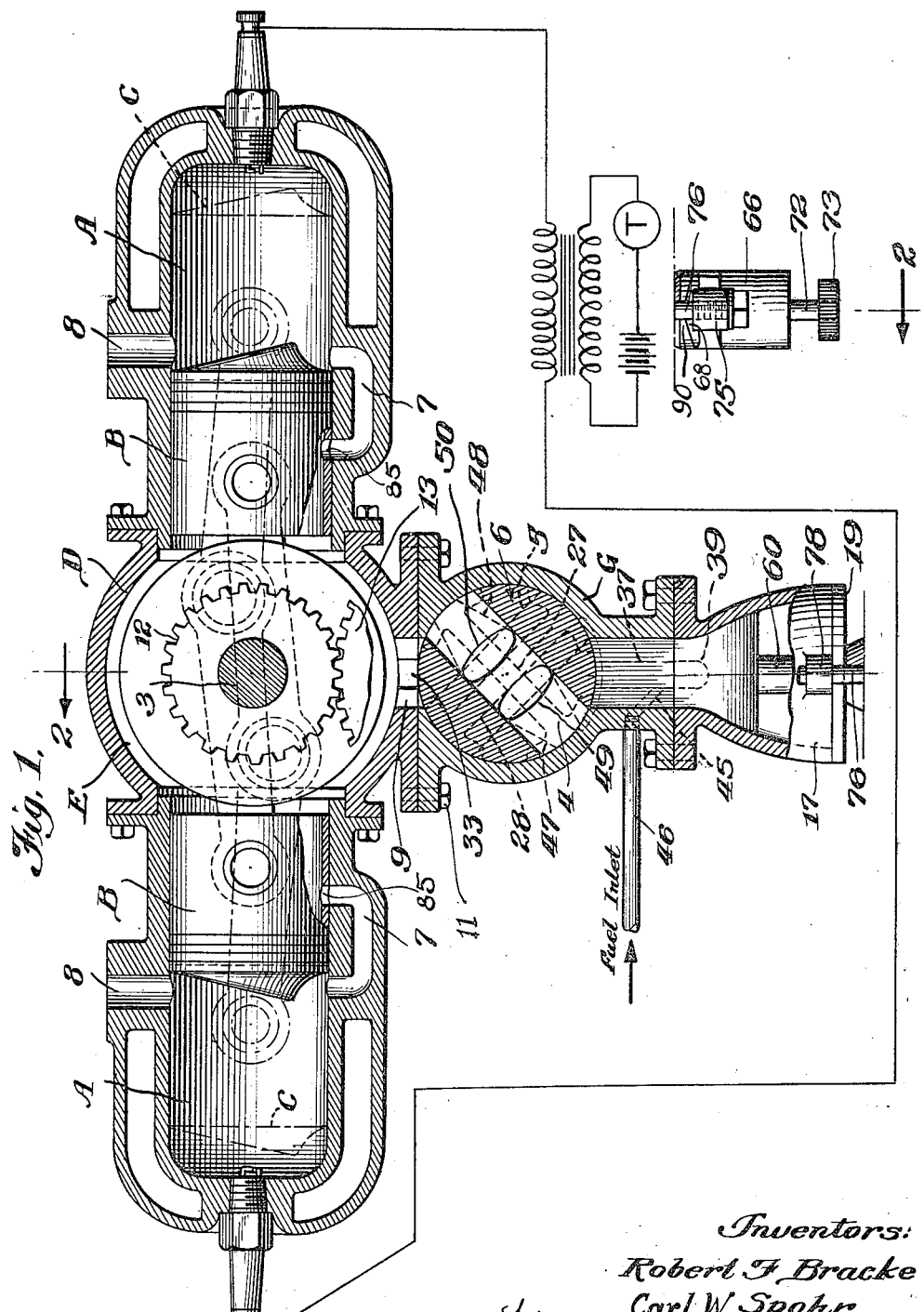
Inventors:
Robert F. Bracke
Carl W. Spohr
By Williams, Bradbury,
McCaleb & Hinkle Attys.

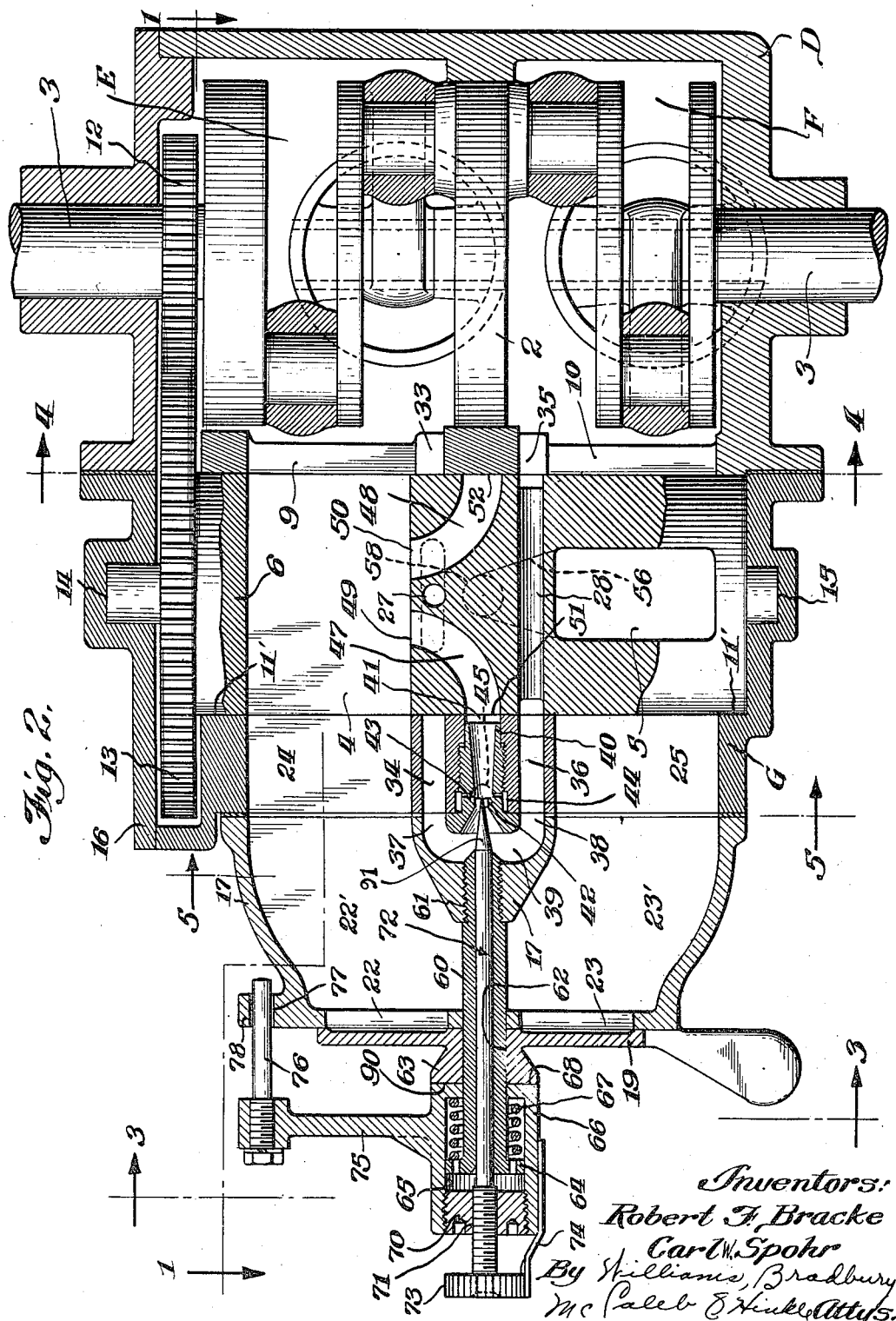

Jan. 28, 1941.    R. F. BRACKE ET AL    2,229,836
INTERNAL COMBUSTION ENGINE
Original Filed Feb. 26, 1931    5 Sheets-Sheet 3
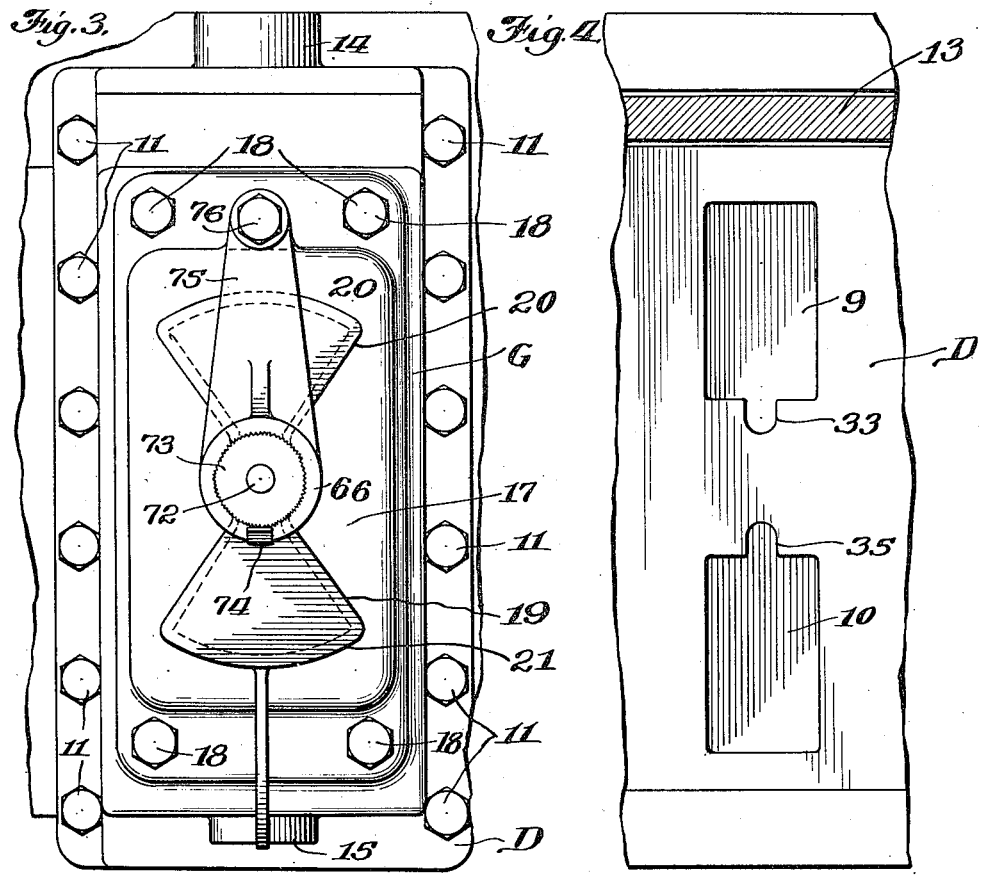
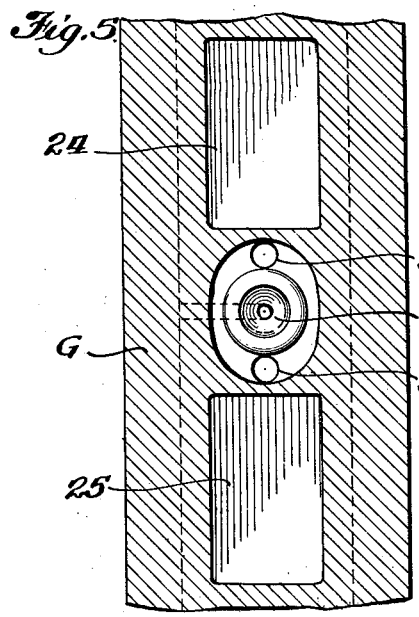
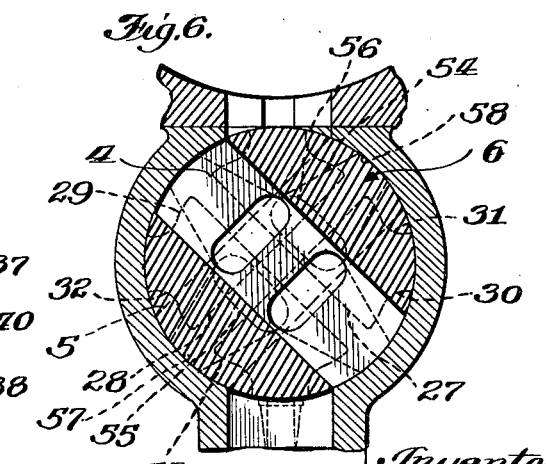

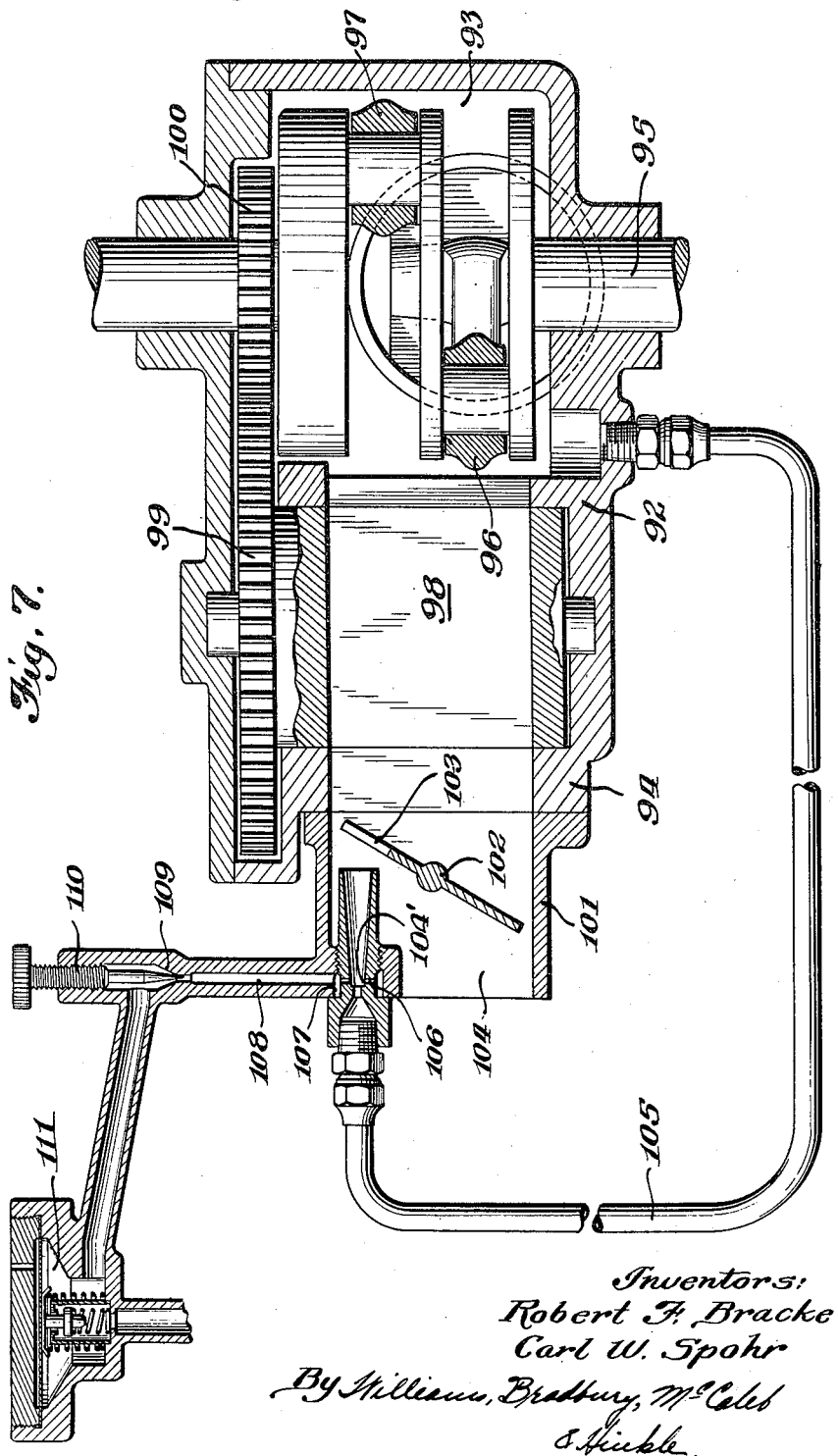

Jan. 28, 1941.  R. F. BRACKE ET AL  2,229,836
INTERNAL COMBUSTION ENGINE
Original Filed Feb. 26, 1931  5 Sheets—Sheet 5
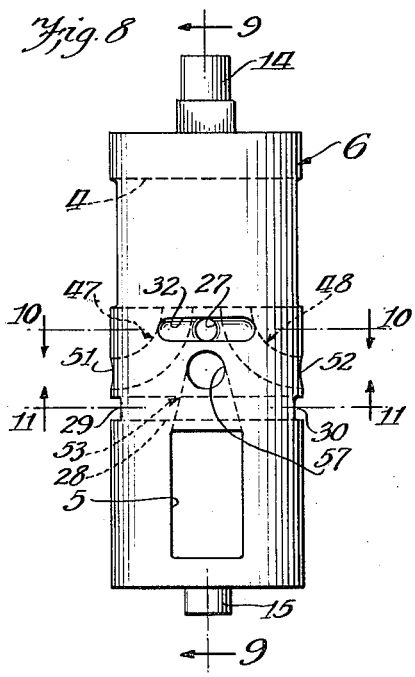
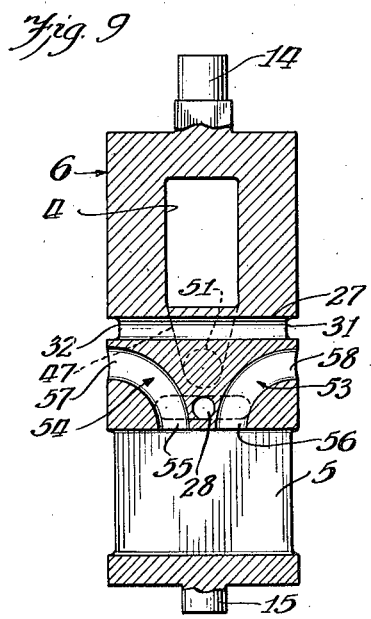
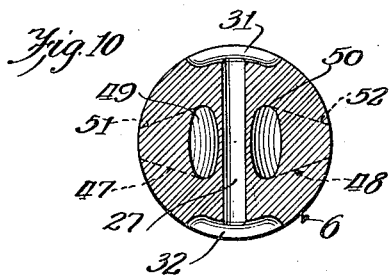
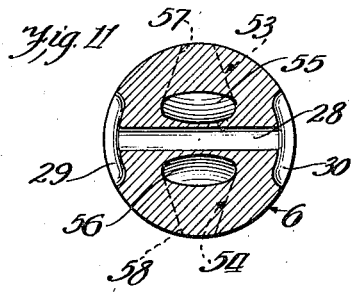
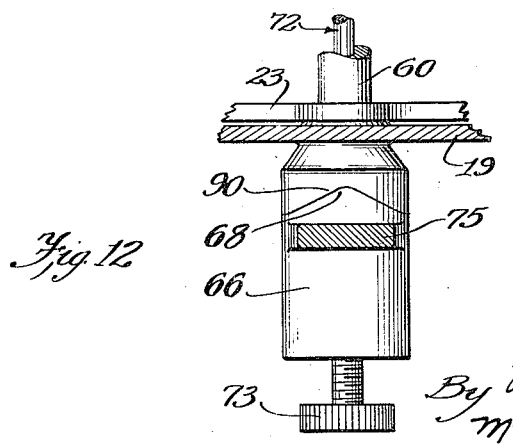

Patented Jan. 28, 1941

2,229,836

UNITED STATES PATENT OFFICE 2,229,836

INTERNAL COMBUSTION ENGINE

Robert F. Bracke and Carl W. Spohr, Chicago, Ill., assignors, by mesne assignments, to Lynn A. Williams, Evanston, Ill., and Clifford C. Bradbury, Glencoe, Ill., as successor trustees Application February 26, 1931, Serial No. 518,469
Renewed November 13, 1935

22 Claims. (Cl. 123—56)

Our invention relates to improvements in internal combustion engines and more particularly to engines of the two-cycle type.

It is the object of the present invention to provide new and improved means for fuel feed.

A further object of the invention is the provision of means whereby the amount of fuel delivered by the carbureting system is dependent upon the amount of air taken into the crankcase of the motor or some other chamber in which the incoming air is compressed before being delivered to the working cylinder. In the present invention the amount of air taken into the motor and consequently the output of the motor is regulated and controlled by a suitable throttle and an arrangement provided whereby the amount of air taken in is a determining factor in the amount of fuel delivered by the fuel feeding system.

Because of the somewhat inconsistent and erratic intake manifold suction or depression present in a two-cycle engine, particularly engines having a small number of cylinders where pulsations in the manifold are very pronounced, it has been somewhat difficult to carburet these motors satisfactorily and in a way to produce the smooth performance common with the four-cycle type of motor. It is one of the objects of the present invention to provide means whereby it is possible and practicable to carburet a two-cycle motor so as to obtain the same smoothness and dependability common in the four-cycle type.

A further object of the present invention resides in the provision of means whereby a high fuel lifting suction may be provided without the necessity of restricting or choking the air intake in the motor for the purpose of fuel lift.

A further object of the invention is the arrangement of means whereby perfect distribution is attained in a motor wherein several cylinders or banks of cylinders are employed.

These and other objects of the present invention will be described in detail in connection with the accompanying drawings herein.

Fig. 1 is a sectional view taken on the line 1—1 of Fig. 2, illustrating a two-cycle internal combustion engine including the features of our invention, Fig. 2 is a sectional view taken along the line 2—2 of Fig. 1, looking in the direction of the arrows indicated thereon and showing the apparatus comprising the invention in a position other than that shown in Fig. 1 to clearly illustrate its application to the engine, Fig. 3 is a view along the line 3—3 of Fig. 2, looking in the direction of the arrows indicated thereon, Fig. 4 is a sectional view along the line 4—4 of Fig. 2, looking in the direction of the arrows indicated thereon;

Fig. 5 is a sectional view along the line 5—5 of Fig. 2, looking in the direction of the arrows thereon;

Fig. 6 is a section plan view of the rotating valve of the engine illustrated in Fig. 1 in one of its positions;

Fig. 7 is a sectional view somewhat like Fig. 2 showing our invention applied to a two cylinder single crankcase two-cycle motor;

Fig. 8 is a side elevation of the rotary valve in the position of Fig. 2;

Fig. 9 is a transverse longitudinal section of the rotary valve taken on the line 9—9 of Fig. 8;

Figs. 10 and 11 are transverse sections taken on the lines 10—10 and 11—11 respectively of Fig. 8; and Fig. 12 is a plan sectional view somewhat similar to the detached bottom extension of Fig. 1 and showing the cam on the throttle.

The internal combustion engine illustrated herein is of the well known two-cycle portable type and may be used to propel outboard motor boats or the like.

Briefly, the engine illustrated in Fig. 1 comprises two pairs of cylinders A with opposed pistons B for the upper pair of cylinders A and pistons C (shown dotted) in the lower pair of cylinders A. A crankcase D is divided into an upper crankcase compartment E and a lower compartment F by an intermediate cylindrical plate 2 integral with the crank shaft 3. The upper and lower crankcase chambers E and F receive alternate fuel charges admitted through passageways 4 and 5 in a rotating valve 6. Passages 7 are provided for by-passing the fuel charge from the respective crankcase chambers E and F forward of the pistons. Exhaust ports 8 are also provided for the escape of exhaust gases from the cylinders after firing. The parts enumerated above comprise those found in any of the present known types of four cylinder, two-cycle engines.

The invention contemplates the use of a Venturi tube interposed between the fuel supply and the fuel induction passages 9 and 10 which communicate with the respective crank-case chambers E and F and in combination with the rotating valve 6 provides a proper fuel charge for all engine speeds.

The rotating valve 6 is rotatably supported in a suitable housing G secured to the crank case D by bolts 11 and rotates within a bore 11' extending vertically therein. A spur gear 12 secured to the crank shaft 3 meshes with a spur gear 13 secured to the rotating valve 6 through the medium of which the valve 6 is rotated. The gears 12 and 13 are of a 2 to 1 ratio providing a half revolution of the valve 6 for each complete revolution of the crank shaft 3 for purposes as will presently be described. The rotating valve 6 is rotatably supported in bearing members 14 and 15 positioned respectively in the base of the housing G and cover plate 16 which encloses the top of the housing G. The passageways 4 and 5 of the valve 6 register respectively with the induction apertures 9 and 10 of the chambers E and F and have their major axes 90 degrees apart.

A housing 17 secured to the valve housing G by suitable bolts 18 supports a throttle 19 of the shutter type provided with diametrically opposite triangular-shaped wing members 20 and 21 adapted to cover the inlet openings 22 and 23 of the passages 22' and 23' in the housing. The inner ends of the passages 22' and 23' register with like contoured openings 24 and 25 in the valve housing, G, these openings 24 and 25 being located diametrically opposite the induction apertures 9 and 10 leading to the chambers E and F. The passageways 4 and 5 of the rotating valve 6 register respectively with the apertures 24, 9 and 25, 10 to provide a through passage for air to the crank-case chambers E and F and in combination with the throttle 19 the admission of air is regulated to control the fuel charge alternately admitted to the chambers E and F.

The intermediate or central portion of the rotating valve 6 which lies between the passageways 4 and 5 has extending therethrough a pair of ducts 27 and 28, the longitudinal axes of which lie in different horizontal planes and spaced 90 degrees apart relative to each other. The respective ends of the duct 27 communicate with diametrically opposite horizontally disposed channels 29 and 30 of a predetermined length and width formed in the circumferential face of the valve 6. The respective ends of the duct 28 also communicate with diametrically opposite horizontally disposed channels 31 and 32 similar to the channels associated with the duct 27. The channels 29 and 30 of the duct 27 alternately register with a narrow aperture 33 which forms a continuation of the induction passage 9 and a duct 34 diametrically opposite the aperture 33 extending horizontally through the end wall of the housing G. The channels 31 and 32 likewise alternately register with a narrow aperture 35 which forms a continuation of the induction aperture 10 and a duct 36 diametrically opposite the aperture 35 extending through the end wall of the housing G. The passages or ducts 34 and 36 lie in the same vertical plane and register with apertures 37 and 38 in the abutting face of the housing 17 and communicate with a chamber 39 also formed therein.

A Venturi tube 40 is projected through the end wall of the housing 17 between the ducts 34 and 36 and lies in the same vertical plane therewith. The inner or delivery end of the Venturi tube 40 terminates in a horizontally positioned channel 41 cut in the circumferential face of bore 11' and is of a predetermined length and width. The outer end of the Venturi tube terminates within the chamber 39. The throat 42 of the Venturi tube 40 has a plurality of radial passages 43 extending therethrough which communicate with the throat 42 and with an annular passage 44 in the housing G. The annular passage is connected by a duct 45 to a suitable tube 46 or the like through which fuel from a suitable fuel supply is elevated to the throat of the Venturi tube. The passage of the compressed fuel charges alternately from the chambers E and F through the throat 42 of the venturi creates a depression thereat which is very much greater than the depression at the outlet or delivery orifice and as this is one of the distinguishing characteristics of the Venturi tube the result is that the fuel chamber is at all times during the operation of the engine subjected to sufficient depression to assure the lifting and conducting of fuel from the main supply to the Venturi tube 40 without the necessity of depending upon the depression in the crank case chambers E and F.

The fuel chamber to which the pipe 46 is connected comprises a diaphragm which is subjected to a depression on that side which is exposed to the fuel chamber and to atmospheric pressure on its opposite side so that the diaphragm is caused to flex by a differential in pressure and thus operate a fuel valve associated therewith for admitting fuel to the chamber from the main supply. This depression in the chamber is maintained by the suction or depression at the throat of the Venturi tube and for a more complete understanding of a fuel lift chamber of this type reference may be had to a copending application of Robert F. Bracke, filed July 25, 1929, Serial No. 380,794, now Patent No. 1,933,043 of October 31, 1933.

A pair of diametrically opposite complementary ducts 47 and 48 arcuately curved from the horizontal to the vertical have outer or delivery ends 49 and 50 opening into the passageway 4 of the valve 6 and their inner or inlet ends 51 and 52 placed in registry with the channel 41 during a predetermined degree of rotation of the valve 6. A pair of diametrically opposite complementary ducts 53 and 54 also angularly disposed to the vertical but spaced 90 degrees apart relative to the ducts 47 and 48 have their respective outer or delivery ends 55 and 56 opening into the passageway 5 of the valve 6 and their inner ends 57 and 58 placed in registry with the channel 41 during a predetermined degree of rotation of the valve 6. These ducts 47, 48 and 53, 54 serve to conduct fuel delivered to the throat 42 of the Venturi tube 40 into the passageways 4 and 5 of the rotating valve 6 and commingle it with the air passing therethrough for delivery to the crank-case chambers E and F, as will be more fully hereinafter described.

A tubular member 60 having one end in threaded engagement with a tapped orifice 61 in the housing 17 and in axial alignment with the Venturi tube 40 extends forward through a central orifice 62 in a projecting lug 63 integral with the shutter throttle 19. The member 60 is provided at its forward end with an annular flange 64 which rests within a central bore 65 of a needle valve supporting member 66. A helical spring 67 resting between the flange 64 and the bottom of the bore 65 maintains the end face 68 of the member 66 which is provided with a cam surface in contactual engagement with a cam face 90 formed on the end face of the lug 63. A plug 70 having threaded engagement with the internally threaded portion of the bore 65 is provided with a tapped orifice 71 adapted to receive the threaded end portion of a needle valve 72. The stem of the needle valve 72 extends through the tubular member 60 and terminates in the intake end of the Venturi tube 40 and in concentric relation therewith. The needle valve 72 may be adjusted longitudinally by means of a knob 73 secured to the exterior end of the valve 72 relative to its position in the intake end of the Venturi tube 40 and a spring member 74 secured to the member 66 cooperates with notches in the circumferential face of the knob 73 and maintains the needle valve 72 in any of its adjusted positions. An upwardly extending arm 75 integral with the member 66 has secured thereto a pin 76 which projects through an orifice 77 in an extending ear 78 integral with the housing 17. The member 66 and the needle valve 72 supported thereon are capable as a whole of longitudinal movement along the member 60, the member 66, however, being held against rotation about the member by the guide pin 76.

In operation, referring to Fig. 1, the pistons B in the upper pair of diametrically opposite cylinders A in the position indicated therein are just nearing dead center after having moved from firing position and are ready to move apart, thus causing the induction of fuel into the upper crankcase chamber E through the passageway 4 of the rotating valve 6. As the pistons B in the upper cylinders are moving apart, the pistons C in the lower pair of cylinders are moving toward each other from firing position and the fuel charge delivered into the lower crankcase chamber F becomes compressed (as at this time the passageway 5 in the valve 6 is closed) so that as they assume the position in which the pistons B are shown in Fig. 1, a relatively high state of compression exists in the crankcase chamber F which assures the by-passing of the compressed charge through the openings 85 in the piston skirts of the pistons C through the by-pass openings 7 forward of the same. The movement of the respective pistons B and C as just described has taken place during one half revolution of the crank shaft 3, whereas the rotating valve 6 will have moved one quarter turn due to the ratio of the gears 12 and 13. The positions of the passageways 4 and 5 in the valve 6 with relation to the positions of the pistons B and C are such that shortly after the upper pistons B have passed dead center and start moving apart the upper passageway 4 will be in a position to register with the diametrically opposite apertures 9 and 24 in the crankcase chamber E and the housing 11. Likewise the passageway 5 will have passed the diametrically opposite apertures 10 and 25 in the lower crankcase chamber F and housing 11, causing the fuel charge that was delivered to the lower crankcase chamber F upon the intake stroke of the piston C to become compressed as these pistons C start their movement toward each other from firing position.

As the major or horizontal axes of the passageway 4 and duct 28 lie in the same vertical plane the rotation of the valve 6 in the direction of the arrow indicated thereon causes the diametrically opposite channels 31 and 32 associated with the duct 28 to register with the orifice 35 communicating with the chamber F and the duct 36 leading to the chamber 39 into which the intake end of the Venturi tube 40 terminates, as clearly illustrated in Fig. 2. As the pistons C now move toward each other from firing position the fuel charge in the chamber F is compressed and a portion of this compressed charge will be forced through the aperture 35, duct 28, duct 36 and into the chamber 39. The passage of this compressed charge into the chamber 39 now passes through this Venturi tube 40 and creates a depression at the throat 42 of the Venturi tube 40 which is much greater than the depression at the outlet or delivery orifice of the Venturi tube caused by the intake stroke of the pistons B of the upper cylinders A.

The duct 47 in the valve 6 is so positioned therein with relation to the passageway 4 that the instant the passageway 4 registers with the opposite apertures 9 and 24, the end 51 of the duct 47 will also register with the horizontally positioned channel 41 into which the delivery end of the Venturi tube 40 terminates. The depression at the throat 42 of the Venturi tube 40 created by the by-passed compressed fuel charge from the chamber F lifts a quantity of fuel from the fuel chamber and is passed through the duct 47 into the passageway 4 where it is commingled with the air passing therethrough and enters the chamber E.

While the pistons B are moving to firing position the fuel charge is being delivered into the chamber E and the pistons C are moving from firing position to compress the fuel charge in the chamber F, a portion of this compressed charge is being delivered to the Venturi tube 40 as above described. During this movement of the pistons B and C as just described, the crank shaft 3 will have rotated one half revolution while the rotating valve 6 will have rotated one quarter revolution. During the greater portion of this quarter revolution of the valve 6 the duct 28 and passage 47 will be in communication respectively with the aperture 35 and duct 36 and the delivery end of Venturi tube 40 providing a maximum period during which the compressed charge by-passed through the Venturi tube is effective to assure the proper quantity of fuel at any engine speed.

At the completion of this quarter turn of the valve 6 the passageway 4 will have moved past the diametrically opposite apertures 9 and 24, the duct 47 will have passed the horizontal channel 41 and the diametrically opposite channels 31 and 32 of the duct 28 will have passed the duct 36 and aperture 35. The passageway 5 at the completion of the quarter turn of the valve 6 is in position to register with the diametrically opposite apertures 10 and 25 in the crank case chamber F and housing G, the intake end 57 of the duct 53 will register with the channel 41 associated with the delivery end of the Venturi tube 40, and the respective horizontal channels 29 and 30 of the duct 27 will be placed in communication with the aperture 33 and duct 34. The pistons B during the second half of the crank shaft revolution move toward each other to compress the fuel charge delivered to the chamber E and the pistons C move apart to firing position. A portion of the fuel charge that is being compressed in the chamber E is now by-passed through the duct 27, passage 34, the chamber 39, and through the Venturi tube 40 creating a depression at the throat of the Venturi tube to deliver a quantity of fuel through the duct 53 into the passageway 5 where it is commingled with the air passing therethrough for delivery to the crank case chamber F.

Upon the completion of the intake stroke of the pistons C the crank shaft will have completed one revolution and the rotating valve 6 has completed one half revolution. During the second revolution of the crank shaft the valve 6 will complete the second half of its revolution and during this half revolution of the valve the ducts 48 and 54 will successively register with the channel 41 and the ducts 28 and 27 will conduct the compressed fuel charges from the respective chambers F and E as is readily understood from the previous description. The function of the passages 53 and 54 corresponds to the function of the passages 47 and 48 above described.

The needle valve 72 which extends into the intake end of the Venturi tube 40 and in concentric relation therewith controls the effective action of the alternate compressed by-passed charges from the crank case chambers E and F at the throat 42 of the Venturi tube 40. The throttle shutter is substantially closed when the engine is idling and the high depression in the crank case chambers E and F during the alternate intake strokes of the pistons B and C is such as to create the necessary suction at the throat of the Venturi tube at such idling speed. The needle valve 72 is initially adjusted longitudinally with respect to the intake opening to control or limit the volume of such compressed charge passing through the throat of the Venturi tube during idling of the engine. The initial adjustment of the needle valve 72 is such that at low speed the needle valve substantially checks the passage of the alternate compressed by-passed charges through the intake end of the Venturi tube 40 and the effect of these charges at this time for increasing the suction at the throat of the venturi is small.

For increased speeds, the throttle shutter 19 is rotated to uncover the openings 22 and 23 and the rotation of the throttle 19 will cause the cam face 90 of the lug 63 forming a portion of the shutter throttle to act upon the cam face 68 of the member 66 to move same longitudinally along the member 60 against the normal compression of the spring 67.

The needle valve 72 being adjustably supported on the member 66 is also moved longitudinally, causing its tapered end 91 to be withdrawn a predetermined distance from the intake end of the venturi 40, the amount of this longitudinal movement of the needle valve 72 for any rotation of the throttle valve 19 being dependent upon the angle of the respective cam faces 68 and 90. This movement of the valve 72 permits a greater effective volume of the compressed by-passed charges to alternately pass through the Venturi tube 40.

When the shutter throttle 19 is moved to completely uncover the apertures 22 and 23 for maximum speed of the engine, the tapered end of the valve 72 will be withdrawn to its maximum degree from the intake end of the Venturi tube 40, permitting the alternately by-passed compressed charges to pass through the Venturi tube 40 with full effect. It will thus be seen that the needle valve 72 by means of the respective cam faces 68 and 90 provides means for calibrating the degree of longitudinal movement of needle valve 72 for any position of the throttle 19 to regulate the volume of the compressed charge passing through the Venturi tube 40 to supply the required quantity of fuel for all engine speeds.

As the speed of the engine is decreased through the agency of the throttle shutter 19 the needle valve 72 and member 66 are moved longitudinally as a whole by the compressed spring 67 to again move the tapered end 91 of the valve 72 into the intake end of the Venturi tube 40 to decrease the action of the alternate by-passed charges in the Venturi tube 40. We thus provide the needle valve 72 with an initial fixed adjustment with respect to the intake opening of the Venturi tube and an automatic longitudinal adjustment under the control of the throttle 19 for calibrating the effective effort of these charges. The degree of movement of the needle valve 72 is of course governed by the angular pitch of the respective cam faces 68 and 90.

In Fig. 7 we have shown our invention applied to a two-cylinder single crankcase two-cycle motor. In this view 92 designates the motor housing which forms the crankcase 93 and the rotor housing 94. The crank shaft 95 is mounted in the housing and carries the rods 96 and 97 each attached to a working piston in the usual manner, one of the pistons and cylinders being shown in this view.

The rotor valve is shown at 98 carrying a gear 99 meshing with the pinion 100 fixed to the crank shaft 95.

The fuel feeding device or carburetor is shown at 101 attached to the rotor valve housing 94 and arranged to carry the throttle 102 provided with a notch 103 constructed to register with the Venturi tube 104. The entrance end of the Venturi tube has communication by means of the pipe 105 with the crankcase 93 as illustrated.

The throat of the Venturi tube 104 is stepped as shown at 104' and carries a series of fuel jets 106 communicating between the throat of the venturi and the annular chamber 107. The annular chamber 107 in turn communicates with the passage 108 which has a seat 109 arranged for cooperation with a needle valve 110. The outer side of this needle valve has direct communication with the fuel supply chamber shown at 111.

In the operation of the device shown in this figure air is drawn past the throttle 102 through the rotor valve and into the crankcase upon the suction stroke of the pistons, the amount of air thus drawn into the motor depending upon the position of the throttle. As the end of the suction stroke of the pistons is reached the rotor valve 98 is moved to a position to shut off communication between the air intake and the crankcase and the pistons continue in the cycle to compress the charge taken into the crankcase. Because of the communicating pipe 105 which extends from the crankcase to the entrance end of the Venturi tube 104 a portion of the compressed charge is forced through the Venturi tube and into the housing 101 and that portion of the housing 94 on the atmospheric side of the rotor valve. This discharge of air through the Venturi tube produces at the throat thereof a comparatively high suction which causes fuel to flow from the fuel chamber 111 into the high velocity air stream of the Venturi tube.

It will be observed that the fuel delivered by the venturi 104 is delivered during the crankcase compression stroke and between the intake strokes thereof but since the normal operating speed of a two-cycle motor is comparatively high the charge of fuel delivered by the Venturi tube does not have sufficient time to fall to the bottom of the housing 101 and is picked up while in suspension by the next or succeeding air intake stroke.

Attention is directed to the fact that the amount of fuel delivered by the venturi is proportionate to the pressure in the crankcase 93 and that the pressure in the crankcase is proportionate to the amount of air taken in. It is apparent from the above that the fuel feeding system is practically independent of the suction produced in the housing 101 and is dependent upon and controlled by the amount of pressure in the crankcase. It will also be observed that by the arrangement shown it is possible to produce at the throat of the Venturi tube a high suction without the necessity of restricting the flow of air through the housing 101. This arrangement makes it possible to locate the fuel supply tank below the normal level of the motor and to lift the fuel without any special pumping means.

Although we have described our invention in connection with the use of crankcase compression in a two cycle engine it is apparent that some other source of pressure may be utilized and still obtain some of the features outlined above. For example it is possible to utilize the compression of the charge during the working or power stroke of the motor, and by-pass such compression of the charge through the Venturi tube for operating the same. It is also conceivable that a super charger or air compressor may be employed for this purpose.

Throughout the specification and claims we have referred to the fuel delivery means as a Venturi tube and we desire that this term "Venturi tube" be construed broadly as meaning any form of aspirator or jet or arrangement of jets in which a rapidly moving stream of fluid is utilized for the purpose of creating suction to deliver fuel.

While we have described our invention as applied to a particular type of combustion engine, it is to be understood that the invention is applicable to other types of engines and changes and modifications may readily suggest themselves and we aim to cover all such changes and modifications as come within the spirit and scope of the appended claims.

We claim:

1. The combination with an internal combustion engine having a plurality of cylinders, a fuel supply, a fuel aspirating Venturi tube dependent upon the passage of air therethrough for its operation, engine controlled means associated with said Venturi tube for by-passing a portion of a compressed charge in one of said cylinders during its power stroke through said tube effective to deliver a quantity of fuel from said supply to an adjacent cylinder during some portion of its intake stroke, and means for calibrating the effectiveness of said by-passed charge passing through said Venturi tube.

2. In an internal combustion engine including crankcase chambers wherein fuel is alternately compressed by engine piston movement, means having passages for admitting fuel charges to said crank-case chambers, a fuel aspirating Venturi tube, said means by-passing a portion of the compressed charge in a chamber through said Venturi tube and effective to supply a quantity of fuel from a fuel supply for injection in an adjacent chamber through said means during the intake stroke of its associated pistons.

3. In an internal combustion engine including crank-case chambers wherein fuel is alternately compressed by engine piston movement, engine controlled means having unrestricted passages for admitting fuel charges to said crank-case chambers, a fuel aspirating Venturi tube, and other passages in said means for by-passing a portion of the compressed charge in a chamber through said Venturi tube and effective to supply a quantity of fuel from a fuel supply for injection in an adjacent chamber through one of said first-mentioned passages during the intake stroke of its associated pistons.

4. In an internal combustion engine including crankcase chambers wherein fuel is alternately compressed by engine piston movement, means having passages for admitting fuel charges to said crank-case chambers, a fuel aspirating Venturi tube, said means by-passing a portion of the compressed charge in a chamber through said Venturi tube and effective to supply a quantity of fuel from a fuel supply for injection in an adjacent chamber through said means during the intake stroke of its associated pistons, and other means for calibrating the effectiveness of said by-passed charge in said Venturi tube during engine operation.

5. In an internal combustion engine including crank-case chambers wherein fuel is alternately compressed by engine piston movement, engine controlled means having unrestricted passages for admitting fuel charges to said crank-case chambers, a fuel aspirating Venturi tube, and other passages in said means for by-passing a portion of the compressed charge in a chamber through said Venturi tube and effective to supply a quantity of fuel from a fuel supply for injection in an adjacent chamber through one of said first-mentioned passages during the intake stroke of its associated pistons, and means for controlling at will the quantity of fuel which is admitted into said chambers during engine operation.

6. In an internal combustion engine including crankcase chambers wherein fuel is alternately compressed by engine piston movement, means having passages for admitting fuel charges to said crankcase chamber, a fuel aspirating Venturi tube, said means by-passing a portion of the compressed charge in a chamber through said Venturi tube and effective to supply a quantity of fuel from a fuel supply for injection in an adjacent chamber through one of said passages in said means during the intake stroke of its associated piston, and a throttle valve controlling other means for calibrating the effectiveness of the by-passed charge through the venturi during engine operation.

7. In an internal combustion engine the combination of cylinder means, piston means therein, crank case means therefor, air intake means for the crank case means, passage means extending between the crank case means and the air intake means, and Venturi tube means forming part of said passage means and arranged for delivery of fuel into said air intake means upon the flow of air from the crank case means through the Venturi tube means into the air intake means.

8. In an internal combustion engine the combination of air intake means, chamber means arranged to receive charges of air and fuel from the air intake means, means for compressing the charges in said chamber means, Venturi tube means arranged to deliver fuel into said air intake means, and means for by-passing portions of the compressed air charges in said chamber means through the Venturi tube means for operating said Venturi tube means.

9. An internal combustion engine comprising a plurality of cylinders each having a piston moving therein, a main air passage to one of the cylinders, and a minor gas passage to the cylinder, the minor passage including a fuel aspirating Venturi tube, a fuel passage thereto, and means for delivering a portion of a gaseous charge, compressed in one of the cylinders, to another cylinder through the minor passage to aspirate the fuel at the Venturi tube.

10. In an internal combustion engine the combination of a plurality of cylinder-crank cases, each comprising a combustion cylinder, a communicating crank case and a piston working in the cylinder and partitioning the cylinder from the crank case, into which cylinder-crank cases fuel charges from a fuel supply are admitted and subsequently compressed by the pistons, a fuel aspirating Venturi tube dependent upon the passage of air therethrough for its operation, and passage means for by-passing a minor portion of a compressed unburned charge from one of said cylinder-crank cases through said tube to deliver a quantity of fuel from said supply to the combustion cylinder of another of said cylinder-crank cases.

11. In an internal combustion engine the combination of a plurality of cylinder-crank cases, each comprising a combustion cylinder, a communicating crank case and a piston working in the cylinder and partitioning the cylinder from the crank case, into which cylinder-crank cases fuel charges from a fuel supply are admitted and subsequently compressed by the pistons, a fuel aspirating Venturi tube dependent upon the passage of air therethrough for its operation, and passage means for by-passing a minor portion of a compressed unburned charge from one of said cylinder-crank cases through said tube to deliver a quantity of fuel from said supply to the combustion cylinder of another of said cylinder-crank cases during the intake stroke of its piston.

12. In an internal combustion engine the combination of a plurality of cylinder-crank cases, each comprising a combustion cylinder, a communicating crank case and a piston working in the cylinder and partitioning the cylinder from the crank case, into which cylinder-crank cases fuel charges from a fuel supply are admitted and subsequently compressed by the pistons, a fuel aspirating Venturi tube dependent upon the passage of air therethrough for its operation, and passage means for by-passing a minor portion of a compressed unburned charge from one of said cylinder-crank cases through said tube during the power stroke of said one cylinder-crank case to deliver a quantity of fuel from said supply to the combustion cylinder of another of said cylinder-crank cases.

13. In an internal combustion engine the combination of a plurality of cylinder crank-cases, each comprising a combustion cylinder, a communicating crank case and a piston working in the cylinder and partitioning the cylinder from the crank case, into which cylinder-crank cases fuel charges from a fuel supply are admitted during the intake strokes and subsequently compressed by the pistons during the power strokes thereof, a fuel aspirating Venturi tube dependent upon the passage of air therethrough for its operation, and passage means for by-passing a minor portion of a compressed unburned charge from one of said cylinder-crank cases through said tube during some portion of the power stroke of said one cylinder-crank case to deliver a quantity of fuel from said supply to the combustion cylinder of another of said cylinder-crank cases during its intake stroke.

14. In an internal combustion engine the combination of a plurality of cylinder-crank cases, each comprising a combustion cylinder, a communicating crank case and a piston working in the cylinder and partitioning the cylinder from the crank case, into which cylinder-crank cases fuel charges from a fuel supply are admitted and subsequently compressed by the pistons, a fuel aspirating Venturi tube dependent upon the passage of air therethrough for its operation, and passage means for by-passing a minor portion of a compressed unburned charge from one of said cylinder-crank cases through said tube during the power stroke of said one cylinder-crank case to deliver a quantity of fuel from said supply to the combustion cylinder of another of said cylinder-crank cases during some portion of the intake stroke thereof.

15. In an internal combustion engine the combination of a plurality of cylinder-crank cases, each comprising a combustion cylinder, a communicating crank case and a piston working in the cylinder and partitioning the cylinder from the crank case, into which cylinder-crank cases fuel charges from a fuel supply are admitted and subsequently compressed by the pistons, a fuel aspirating Venturi tube dependent upon the passage of air therethrough for its operation, and passage means for by-passing a minor portion of a compressed unburned charge from one of said cylinder-crank cases through said tube to deliver a quantity of fuel from said supply to the combustion cylinder of another of said cylinder-crank cases during the intake stroke thereof.

16. In an internal combustion engine the combination of a plurality of cylinder-crank cases, each comprising a combustion cylinder, a communicating crank case and a piston working in the cylinder and partitioning the cylinder from the crank case, means for by-passing from one of said cylinder-crank cases a portion of the charge therefor during the power stroke of the piston, a fuel supply, a fuel aspirating Venturi tube through which said by-passed charge passes and effective to deliver a quantity of fuel from said fuel supply for injection into the combustion cylinder of another of said cylinder-crank cases during its intake stroke.

17. In an internal combustion engine, the combination of a plurality of cylinder-crank cases, each comprising a combustion cylinder, a communicating crank case and a piston working in the cylinder and partitioning the cylinder from the crank case, means for by-passing from one of said cylinder-crank cases a portion of the charge therefor during the power stroke of the piston, a fuel supply, a fuel aspirating Venturi tube through which said by-passed charge passes and effective to deliver a quantity of fuel from said fuel supply for injection into the combustion cylinder of another of said cylinder-crank cases during its intake stroke, and other means controlling the effectiveness of said by-pass charge through said Venturi tube.

18. In an internal combustion engine, the combination of a plurality of combustion cylinders, pistons therefor, crank case means therefor, a fuel aspirating Venturi tube dependent upon the passage of air therethrough for its operation, and passage means for by-passing a minor portion of a charge compressed by the pistons of one of said cylinders, through said tube for delivery of a quantity of fuel from said supply to another of said combustion cylinders.

19. An internal combustion engine comprising a cylinder, an intake valve therefor, an air intake, a throttle valve therefor, a Venturi tube in air-feeding relation to the intake valve, means for supplying liquid fuel to the Venturi tube for aspiration thereby, and pump means receiving air from the intake posteriorly of the throttle and delivering it to the Venturi tube for fuel aspirating passage therethrough.

20. An internal combustion engine comprising a cylinder, an intake valve therefor, an air intake, a throttle valve therefor, a Venturi tube in air-feeding relation to the intake valve, means for supplying liquid fuel to the Venturi tube for aspiration thereby, and air metering pump means driven by the engine in timed relation to the cycle of the cylinder receiving air from the intake posteriorly of the throttle and delivering it to the Venturi tube for fuel aspirating passage therethrough, whereby the amount of fuel aspirated by the venturi per cycle of the cylinder is proportional to engine demand as reflected by the pressure of the intake air posteriorly of the throttle.

21. An internal combustion engine comprising a combustion chamber, an air intake passage, a restriction for the intake passage, air-operated fuel feed means, pump means driven in timed relation to the engine for withdrawing from the intake passage posteriorly of the restriction a uniform volume of air and forcing the air of said volume to the fuel feed means for delivering to the chamber a quantity of fuel proportional to the amount of air in said volume.

22. An internal combustion engine comprising a plurality of cylinders, means forming an air intake passage therefor, a throttle valve in the intake passage, Venturi tube means, fuel supply means to the Venturi tube means, pump means drive in timed relation to the engine withdrawing from the intake passage posteriorly of the throttle valve uniform volumes of air and forcing them through the Venturi tube means for admixture, with the air of the volumes, of quantities of fuel proportional to the amount of air in said volumes, and means for feeding, from the venturi means to the respective cylinders, said volumes and the fuel admixed therewith.

ROBERT F. BRACKE.
CARL W. SPOHR.